US012704170B2

(12) United States Patent
Cavallino et al.

(10) Patent No.: US 12,704,170 B2
(45) Date of Patent: Aug. 11, 2026

(54) APPARATUS WITH A DUAL-CLUTCH GEARBOX FOR A MOTOR VEHICLE

(71) Applicant: FERRARI S.P.A., Modena (IT)

(72) Inventors: Carlo Cavallino, Modena (IT); Antonio Foderaro, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 19/014,619

(22) Filed: Jan. 9, 2025

(65) Prior Publication Data

US 2025/0224021 A1 Jul. 10, 2025

(30) Foreign Application Priority Data

Jan. 10, 2024 (IT) ........................ 102024000000348

(51) Int. Cl.

*F16H 3/00* (2006.01)
*F16H 3/089* (2006.01)
*F16H 3/091* (2006.01)

(52) U.S. Cl.

CPC ....... *F16H 3/006* (2013.01); *F16H 2003/008* (2013.01); *F16H 3/089* (2013.01); *F16H 3/091* (2013.01); *F16H 2200/0056* (2013.01)

(58) Field of Classification Search

CPC .......... F16H 3/006; F16H 3/089; F16H 3/091; F16H 2200/0056

See application file for complete search history.

(56) References Cited

U.S. PATENT DOCUMENTS

2004/0093972 A1 5/2004 Gumpoltsberger et al.

FOREIGN PATENT DOCUMENTS

| | | | | | |
|---|---|---|---|---|---|
| DE | 102010010436 A1 | | 9/2011 | | |
| JP | 2003237393 A | * | 8/2003 | ............ | F16H 3/006 |
| WO | 2007082572 A1 | | 7/2007 | | |

OTHER PUBLICATIONS

Examiner Hurtado L. Martinex, Italian Search Report and Written Opinion, Italian Patent Application 202400000348, Completion Date Jun. 14, 2024, 8 pp.

* cited by examiner

*Primary Examiner* — William C Joyce
(74) *Attorney, Agent, or Firm* — The Belles Group, P.C.

(57) ABSTRACT

An apparatus with a dual-clutch gearbox for a motor vehicle is disclosed. The apparatus can comprise an input shaft, a first shaft, a second shaft, and a double clutch controllable to selectively connect one of the first and second shafts with the input shaft. The apparatus further comprises an output shaft and a plurality of engagement devices operable to selectively connect one of the first and second shafts with the output shaft.

12 Claims, 2 Drawing Sheets

8
16
15'
15"
15
22
14"
14'
14
13'
13"
13
12"
19
12
12'
5
4
24"
24
24'
21
11"
11'
11
10'
10
D
18
10"
20
9
9"
9'
23
B≡C
7
17
6
3
A

APPARATUS WITH A DUAL-CLUTCH GEARBOX FOR A MOTOR VEHICLE

CROSS-REFERENCE TO RELATED APPLICATION

This patent application claims priority from Italian patent application no. 102024000000348 filed on Jan. 10, 2024, the entire disclosure of which is incorporated herein by reference.

TECHNICAL FIELD

The invention relates to an apparatus with a dual-clutch gearbox for a motor vehicle.

BACKGROUND

As it is known, some electric hybrid motor vehicles, namely provided with an internal combustion engine and with at least one electric motor-generator for the propulsion, are provided with a dual-clutch gearbox. Typically, a dual-clutch gearbox includes a secondary shaft or output shaft defining an output of the gearbox or connected to at least one axle of the motor vehicle, as well as two primary shafts respectively connected to an input of the gearbox by means of respective clutches arranged in parallel and defining a dual clutch. The two primary shafts respectively carry first and second gearwheels, which, by meshing with corresponding third gearwheels carried by the secondary shaft, determine a first group of gears, normally the even gears, and a second group of gears, normally the odd gears, respectively.

For the engagement of one of the gears, one of the two gearwheels forming the gear to be engaged is caused to become rotationally fixed to the relative carrying shaft of the primary shafts and the secondary shaft by means of an engagement device, for example a synchronizer, while the other of the two gearwheels is configured, in itself, to be rotationally fixed to the relative carrying shaft of the primary shafts and the secondary shaft. Generally speaking, there is a need to provide an alternative dual-clutch gearbox compared to those already known. More specifically, there is a need to provide a dual-clutch gearbox with smaller dimensions, while having efficiency and effectiveness at least comparable to those already known.

An object of the invention is to fulfil one of the needs discussed above, preferably in a simple and reliable fashion.

DESCRIPTION OF THE INVENTION

In one form, the invention can be an apparatus with a dual-clutch gearbox for a motor vehicle, the dual-clutch gearbox comprising an input shaft to be connected to a power source of the motor vehicle, a first shaft extending along a straight axis and carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels, a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels, an output shaft to be connected to an axle of the motor vehicle, the output shaft carrying a plurality of third gearwheels meshing with the first gearwheels to form first gears and a plurality of fourth gearwheels meshing with the second gearwheels to form second gears, wherein the third and fourth gearwheels meshing with the first and second engageable gearwheels, respectively, are carried in a fixed manner by the output shaft, thus defining respective elements of a set of rotationally fixed third gearwheels, and wherein the third and fourth gearwheels meshing respectively with the first and second rotationally fixed gearwheels are rotatably carried with respect to the output shaft, thus defining respective elements of a set of third engageable gearwheels, a double clutch selectively controllable to connect one between the first and second shafts with the input shaft, a first engagement means for each of the first engageable gearwheels, the first engagement means being controllable for rotationally fixing the relative between the first engageable gearwheels to the first shaft selectively, a second engagement means for each of the second engageable gearwheels, the second engagement means being controllable for rotationally fixing the relative between the second engageable gearwheels to the second shaft selectively, a third engagement means for each of the third engageable gearwheels, the third engagement means being controllable to rotationally fix the relative between the third engageable gearwheels to the output shaft selectively, a reverse gear comprising at least a seventh and an eighth gearwheel respectively carried in a fixed manner by a third shaft, defined by one between the first and second shafts, and by the output shaft in a rotatable manner with respect to the output shaft, or respectively carried by the third shaft in a rotatable manner with respect to the third shaft and in a fixed manner by the output shaft, respectively, and a fourth engagement means controllable for rotatably fixing the gearwheel carried in a rotatable manner between the seventh and eighth gearwheels to the relevant bearing shaft between the third shaft and the output shaft, wherein a gear between the first gears and the other gears between the first gears form a first gear group with the reverse gear and a second gear group, respectively, wherein the first gear group is arranged between the second gear group and the second gears according to the said straight axis, wherein the first shaft and the output shaft also carry, respectively, a fifth gear wheel and a sixth gear wheel meshing with the fifth gear wheel to form a third gear, wherein the third gear, the first gears, and the second gears respectively comprise one gear, two gears, and four gears defining respective seven transmission ratios numerically reorderable in an ascending order from a first transmission ratio up to a seventh transmission ratio so as to correspond to seven respective degrees of reduction in angular input speed gradually decreasing from the first to the seventh gear ratio, the gear ratios being thus divisible into even and odd ratios according to their numerical order wherein the second gears comprise a sixth, a seventh, an eighth, and a ninth gear, wherein the sixth and seventh gears form a third gear group and define the seventh gear ratio and the fifth gear ratio, respectively, and the eighth and ninth gears form a fourth gear group and define the third and first gear ratio, respectively, the third gear group being arranged between the first gear group and the fourth gear group, wherein the fifth gearwheel is carried by the first shaft in a rotatable manner about the first shaft, thus making part of the set of the first engageable gearwheels, wherein the sixth gearwheel is carried by the output shaft in a fixed manner with respect to the output shaft, thus making part of the set of the third rotationally fixed gearwheels, or in a rotating manner with respect to the output shaft, thus making part of the set of the third engageable gearwheels, the apparatus further comprising an electric motor-generator having a rotor coupled to the fifth gearwheel via a transmission, such that a rotation of the rotor can be transmitted to the fifth gearwheel and vice versa.

In one form, the invention can be a transmission for a motor vehicle, the transmission comprising an input configured to be connected to a power source of the motor vehicle, a first shaft extending along a straight axis and carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels, a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels, an output shaft configured to be connected to an axle of the motor vehicle, the output shaft carrying a plurality of third gearwheels meshing with the first gearwheels to form first gear trains and a plurality of fourth gearwheels meshing with the second gearwheels to form second gear trains, wherein the third and fourth gearwheels meshing with the first and second engageable gearwheels, respectively, are carried in a fixed manner by the output shaft, thus defining respective elements of a set of rotationally fixed third gearwheels, and wherein the third and fourth gearwheels meshing respectively with the first and second rotationally fixed gearwheels are rotatably carried with respect to the output shaft, thus defining respective elements of a set of third engageable gearwheels, a double clutch selectively controllable to connect one between the first and second shafts with the input, a first engagement device for each of the first engageable gearwheels, each first engagement device being controllable to rotationally fix a said first engageable gearwheel to the first shaft selectively, a second engagement device for each of the second engageable gearwheels, each second engagement device being controllable to rotationally fix a said second engageable gearwheel to the second shaft selectively, a third engagement device for each of the third engageable gearwheels, each third engagement device being controllable to rotationally fix a said third engageable gearwheel to the output shaft selectively, wherein the first shaft and the output shaft also carry, respectively, a fifth gear wheel and a sixth gear wheel meshing with the fifth gear wheel to form a third gear train, a reverse gear train comprising a seventh gearwheel and an eighth gearwheel respectively carried in a fixed manner by a third shaft, defined by one between the first and second shafts, and by the output shaft in a rotatable manner with respect to the output shaft, or respectively carried by the third shaft in a rotatable manner with respect to the third shaft and in a fixed manner by the output shaft, respectively, wherein a gear train between the first gear trains and the other gear trains between the first gear trains form a first gear group with the reverse gear train and a second gear group, respectively, wherein the first gear group is arranged between the second gear group and the second gear trains according to the said straight axis, wherein the third gear train, the first gear trains, and the second gear trains respectively each comprise one gear, two gears, and four gears defining respective seven transmission ratios numerically reorderable in an ascending order from a first transmission ratio up to a seventh transmission ratio so as to correspond to seven respective degrees of reduction in angular input speed gradually decreasing from the first to the seventh gear ratio, the gear ratios being thus divisible into even and odd ratios according to their numerical order, wherein the second gear trains comprise two gear trains that form a third gear group and define the seventh gear ratio and the fifth gear ratio, respectively, and two gear trains that form a fourth gear group and define the third and first gear ratio, respectively, the third gear group being arranged between the first gear group and the fourth gear group, wherein the fifth gearwheel is carried by the first shaft in a rotatable manner about the first shaft, thus making part of the set of the first engageable gearwheels, and wherein the sixth gearwheel is carried by the output shaft in a fixed manner with respect to the output shaft, thus making part of the set of the third rotationally fixed gearwheels, or in a rotating manner with respect to the output shaft, thus making part of the set of the third engageable gearwheels.

BRIEF DESCRIPTION OF THE DRAWINGS

Hereinafter, an embodiment of the invention will be described, in order to allow the latter to be better understood, by way of non-limiting example and with reference to the accompanying drawings, wherein.

DETAILED DESCRIPTION OF THE INVENTION

Figure 1:
FIG. 1 is a perspective view of a motor vehicle comprising an apparatus with a dual-clutch gearbox according to the invention.

In FIG. 1, reference number 1 is used to indicate, as a whole, a motor vehicle.

The motor vehicle 1 comprises four wheels 2, at least two of them being drive wheels and being coupled to one another by means of an axle, for example of a known type and not shown.

The motor vehicle 1 further comprises a power or torque source 3, in particular an internal combustion engine.

The motor vehicle 1 further comprises an apparatus preferably comprising, in turn, a further source of power or torque, in particular an electric motor-generator 4, and a dual-clutch gearbox 5.

The dual-clutch gearbox 5 comprises an input shaft 6 connected to the source 3, namely caused to rotate by the source 6. Specifically, the shaft 6 extends along an axis A, for example a straight axis.

Furthermore, the gearbox 5 comprises two primary shafts 7, 8, namely a first and a second shaft 7, 8, in other words.

The shaft 7 specifically extends along an axis B (for example, a straight axis), in particular parallel to and more in particular coinciding with the axis A.

Preferably, the shaft 8 is coaxial to the shaft 7, namely it extends along an axis C that is parallel to and coinciding with the axis B. Alternatively, the axis C could only be parallel to and not coinciding with the axis B or not even parallel to the axis B, according to variants that are not shown herein.

The shaft 7 carries a plurality of gearwheels 9', 10', 11', each of which can be carried in a fixed manner by the shaft 7, namely can be attached to the shaft 7, or in a rotatable manner with respect to the shaft 7 around the axis B, i.e. so as to be able to rotate around the axis B independently of the rotation of the shaft 7.

In this way, the gearwheels of the gearwheels 9', 10', 11' carried in a fixed manner define elements of a set of first rotationally fixed gearwheels, while the gearwheels of the gearwheels 9', 10', 11' carried in a rotatable manner define elements of a set of first rotatable or engageable gearwheels.

Similarly, the shaft 8 carries a plurality of gearwheels 12', 13', 14 ', 15', each of which can be carried in a fixed manner by the shaft 8, i.e. can be attached to the shaft 8, or in a rotatable manner with respect to the shaft 8 around the axis C, i.e. so as to be able to rotate around the axis C independently of the rotation of the shaft 8.

In this way, the gearwheels of the gearwheels 12', 13', 14', 15' carried in a fixed manner define elements of a set of second rotationally fixed gearwheels, while the gearwheels of the gearwheels 12', 13', 14', 15' carried in a rotatable manner define elements of a set of second rotating or engageable gearwheels.

Furthermore, the gearbox 5 comprises an output shaft or secondary shaft 16 connected to the axle or (drive) wheels 2, namely configured to transmit a rotation thereof to the axle or to the wheels 2.

The output shaft 16 extends along an axis D, for example a straight axis, specifically parallel to the axis B and, independently, also to the axis C.

The output shaft 16 carries a plurality of gearwheels 9", 10", 11", 12", 13", 14", 15" respectively meshing with the gearwheels 9', 10', 11', 12', 13', 14', 15' to form respective gears 9, 10, 11, 12, 13, 14, 15.

The gearwheels of the gearwheels 10", 11", 12", 13", 14", 15" that respectively mesh with the engageable gearwheels are carried in a fixed manner by the shaft 16, thus defining respective elements of a third set of rotationally fixed gearwheels, while the gearwheels of the gearwheels 10", 11", 12", 13", 14", 15" that mesh with the rotationally fixed gearwheels are carried in a rotatable manner with respect to the shaft 16 around the axis D, thus defining respective elements of a third set of engageable gearwheels.

In the embodiment shown herein, the gearwheel 10' and, independently, the gearwheels 12', 13' are engageable gearwheels, namely they are carried by the shaft 7 and the shaft 8 in a rotatable manner around the axes B and C, respectively.

Consequently, the gearwheels 10", 12", 13" are rotationally fixed gearwheels, namely they are carried by the shaft 16 in a rotationally fixed manner with respect to the shaft 16.

In addition, the gearwheel 11' and, independently, the gearwheels 14', 15' are rotationally fixed gearwheels, namely they are carried by the shaft 7 and the shaft 8 in a fixed manner with respect to the shaft 7 and the shaft 8, namely they are attached to them, respectively.

Consequently, the gearwheels 11", 14", 15" are engageable gearwheels, namely they are carried by the shaft 16 in a rotatable manner with respect to the shaft 16 around the axis D.

Conveniently, the gearwheels 9', 9" meshing with each other to form the gear 9 are both carried by the respective shafts 7, 16 in a rotatable manner with respect to the shafts 7, 16, respectively, whereby the gearwheels 9', 9" are both engageable gearwheels, i.e. forming part of the set of first and third engageable gearwheels, respectively, namely defining respective elements of the set of first engageable gearwheels and of the set of third engageable gearwheels.

According to an alternative that is not shown herein, the gearwheel 9" is carried by the output shaft 16 in a fixed manner with respect to the output shaft 16, namely it is attached to it. Here, the gearwheel 9" would be part of the set of rotationally fixed gearwheels, namely it would define an element of the set of rotationally fixed gearwheels.

In order to engage the gears 9, 10, 11, 12, 13, 14, 15, the gearbox 5 comprises a plurality of engagement devices, including an engagement device 17 configured or controllable to selectively connect one of the shaft 7 and the shaft 8 to the input shaft 6, so that the connected shaft of the shafts 7, 8 is caused to rotate by the rotation of the shaft 6 or by the source 3, as well as engagement or selection devices 18, 19, 20, 21, 22 configured or controllable to engage, i.e. to rotatably fix the engageable gearwheels to the relative carrying shafts of the shafts 7, 8, 16.

The apparatus of the motor vehicle 1 comprises a control unit ECU configured to control each of the engagement devices 17, 18, 19, 20, 21, 22.

Figure 2:
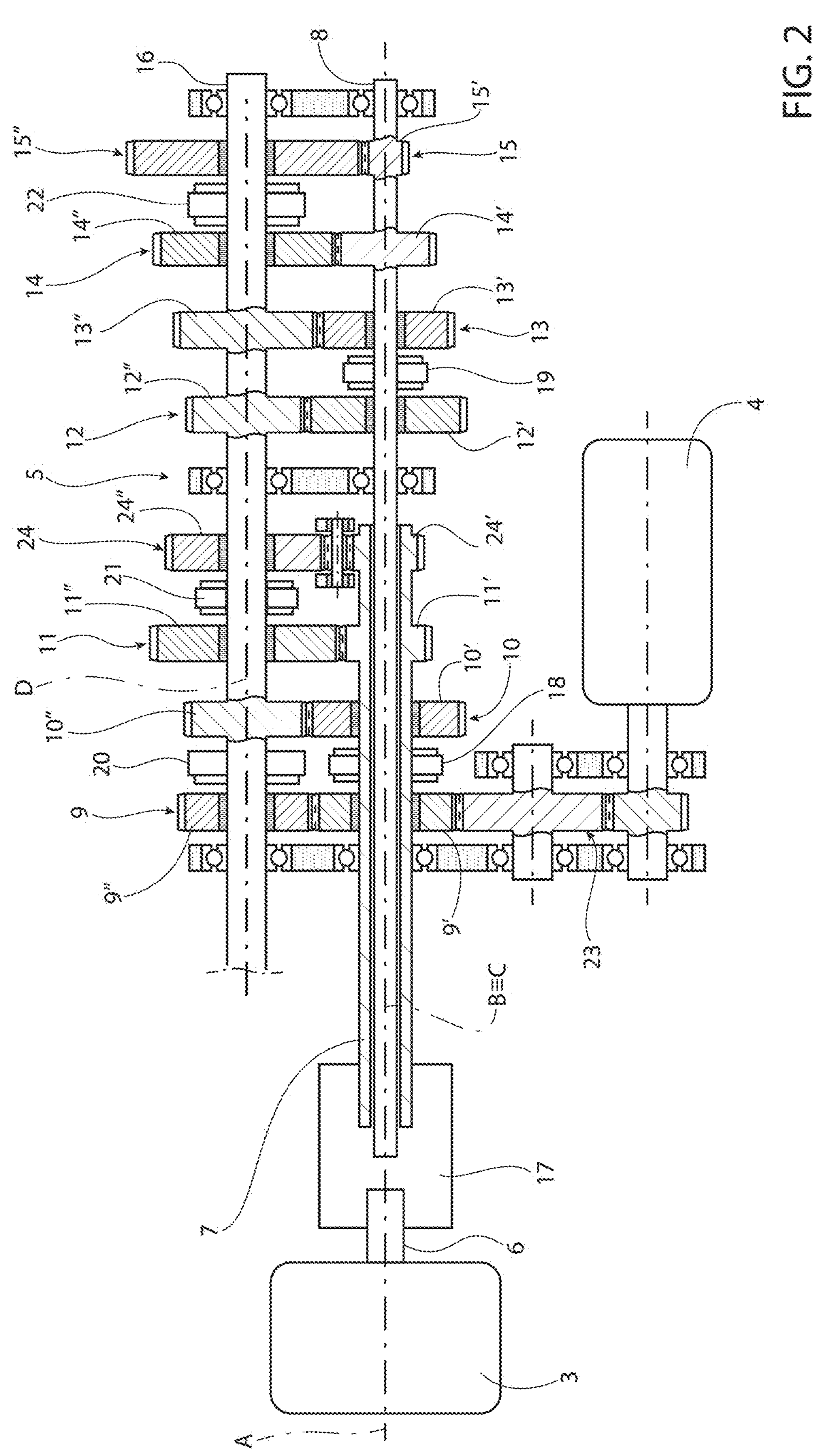
FIG. 2 is a schematic, cross-sectional representation of the architecture of the dual-clutch gearbox.

In particular, the engagement device 17 is a dual clutch (for example of a known type, which is schematically shown in FIG. 2 with a rectangle), namely a device comprising two clutches respectively configured or controllable to connect the shaft 7 and the shaft 8 to the shaft 6 in an alternative manner.

The engagement or selection devices 18, 19, 20, 21, 22 could be toothed dog-clutches or synchronizers.

Preferably, the engagement device 20 is a dog-clutch. Clearly, in the alternative where the gearwheel 9" is fixed to the shaft 16, the engagement device 20 would be absent.

Furthermore, preferably, each of the engagement devices 18, 19, 21, 22 is a synchronizer.

Specifically, the engagement device 18 is configured or controllable to selectively engage, i.e. to rotationally fix to the shaft 7, one of the gearwheels 9', 10' (namely, one of the first engageable gearwheels).

Therefore, as already mentioned above, the gearwheel 10", namely one of the third rotationally fixed gearwheels that meshes with the gearwheel 10', is carried in a fixed manner by the output shaft 16, in particular in a position adjacent to or facing the gearwheel 9".

Hence, the function of the engagement device 18 is shared by the gearwheels 9', 10'; this is however not to be understood as a necessarily limiting example, since the engagement device 18 can be functionally considered as two independent engagement devices, each of which is dedicated to engaging the corresponding one of the gearwheels 9', 10'. As a matter of fact, the engagement device 18 is controlled to engage the gearwheel 9' or the gearwheel 10' in an alternative manner, whereby it cannot simultaneously engage the gearwheels 9', 10'. In addition, the engagement device 18 could also be replaced by two totally independent and separate engagement devices, as well as dedicated to engaging the wheels 9', 10', respectively. Similar observations also apply to the other engagement or selection devices 19, 21, 22, which is why they will not be repeated for the sake of brevity.

In particular, the engagement device 18 (namely, the engagement device for the gearwheel 9') is axially carried by the shaft 7 between the gearwheels 9', 10' (namely, one of the first engageable gearwheels), more in particular in an axially movable manner along the axis B.

The engagement device 19 is configured or controllable to selectively engage, i.e. to rotationally fix to the shaft 8, one of the gearwheels 12', 13'.

In particular, the engagement device 19 is axially carried by the shaft 8 between the wheels 12', 13', more in particular in an axially movable manner along the axis C.

The engagement device 20 is configured or controllable to selectively engage, i.e. to rotationally fix to the shaft 16, the gearwheel 9".

In particular, the engagement device 20 is axially carried by the shaft 16 between the gearwheels 9", 10", more in particular in an axially movable manner along the axis D.

In other words, since the gearwheel 10" is, in particular, one of the rotationally fixed gearwheels, the engagement device 20 is axially carried by the shaft 16 between one of the third engageable gearwheels (the gearwheel 9") and one of the third rotationally fixed gearwheels. Therefore, the engagement device 20 is independent or movable independently of any other of the engagement devices 17, 18, 19, 20, 21, 22 or, more generally, any other engagement device.

In other words, the engagement device 20 is configured or controllable to exclusively engage the gearwheel 9", namely to engage the gearwheel 9" in a dedicated manner, i.e. it is arranged or configured not to control or not to be able to control other gearwheels in addition to the gearwheel 9".

Therefore, alternatively, the gearwheel 9" is axially arranged between the engagement device 20 and all the other gearwheels carried by the output shaft 16.

The engagement device 21 is configured or controllable to selectively engage, i.e. to rotationally fix to the shaft 16, the gearwheel 11".

In particular, the engagement device 21 is axially carried by the shaft 16 between the gearwheels 11", 12", more in particular in an axially movable manner along the axis D.

The engagement device 22 is configured or controllable to selectively engage, i.e. to rotationally fix to the shaft 16, one of the gearwheels 14", 15".

In particular, the engagement device 22 is axially carried by the shaft 16 between the gearwheels 14", 15", more in particular in an axially movable manner along the axis D.

To sum up, the gearbox 5 comprises a first engagement device (here, the device 18) for each of the first engageable gearwheels (here, the gearwheels 9', 10'), a second engagement device (here, the device 19) for each of the second engageable gearwheels (here, the gearwheels 12', 13') and a third engagement device (here, one of the devices 20, 21, 22) for each of the third engageable gearwheels (here, the gearwheels 9", 11", 14", 15").

Clearly, in the event that the set of second engageable gearwheels were an empty set, i.e. for example in the event that none of the gearwheels 12', 13', 14 ', 15' were carried in a rotatable manner with respect to the shaft 8, the second engagement device would be superfluous and therefore absent.

The motor-generator 4 comprises a rotor (not shown) coupled or connected to the gearwheel 9' through a transmission 23, for example comprising or defined by a reduction gear unit, such that a rotation of the rotor can be transmitted to the gearwheel 9' and vice versa.

For example, the transmission 23 can comprise an engagement or clutch device (not shown) to selectively determine and interrupt the coupling or connection between the rotor and the gearwheel 9'.

The gears 9, 10, 11, 12, 13, 14, 15 define seven respective gear ratios or gears numerically reorderable in an ascending order from a first gear ratio or gear to a seventh gear ratio or gear corresponding to seven respective degrees of reduction of the input angular speed (angular speed of one of the shafts 7, 8) gradually decreasing from the first to the seventh gear ratio. In other words, the angular speed of the shaft 16 is reduced with respect to the input angular speed by means of the gears 9, 10, 11, 12, 13, 14, 15 according to the respective gear ratios.

Herein, the gear ratio is defined as a reduction ratio, i.e. as a number smaller than or equal to one resulting from the ratio between the angular speed of the shaft 16 and the input angular speed (angular speed of the shaft 7 or 8, depending on the engaged gear of the gears 9, 10, 11, 12, 13, 14, 15).

The first gear ratio is the smallest, while the seventh gear ratio is the greatest, namely the closest to one. The gear ratios are therefore increasing from the first to the seventh gear ratio, in numerical order.

The gear ratios are divisible into even ratios and odd ratios according to their numerical order (first, third, fifth and seventh are odd ratios, while second, fourth and sixth are even ratios). Consequently, the gears 9, 10, 11, 12, 13, 14, 15, each of which is associable with a corresponding one of the gear ratios, can define the even gears 9, 10, 11 and the odd gears 12, 13, 14, 15, 16 as well. Hence, the even gears 9, 10, 11 define the even ratios, while the odd gears 12, 13, 14, 15 define the odd ratios.

The gear 9 preferably defines the fourth gear ratio. In other words, the gearwheel 9" has a diameter that is larger than that of three other of the wheels 10", 11", 12", 13", 14", 15" and smaller than that of three other of the wheels 10", 11", 12", 13", 14", 15", namely a median diameter.

Furthermore, the gear 10 preferably defines the sixth gear ratio. In other words, the gearwheel 10" has a diameter that is smaller than that of five other of the wheels 9", 11", 12", 13", 14", 15" and larger than that of another of the wheels 9", 11", 12", 13", 14", 15".

According to an alternative that is not shown herein, the gear 9 could define the sixth gear ratio, while the gear 10 would define, in this case, the fourth gear ratio.

Therefore, the gear 9 defines one of the fourth and the sixth gear ratio, while the gear 10 defines the other one of the fourth and the sixth gear ratio.

Furthermore, the gear 11 preferably defines the second gear ratio. In other words, the gearwheel 11" has a diameter that is larger than that of five other of the wheels 9", 10", 12", 13", 14", 15" and smaller than that of another of the wheels 9", 10", 12", 13", 14", 15".

The gear 10 is axially arranged between the gears 9, 11 (according to the axis B or the axis D). Therefore, one of the fourth and the sixth gear ratio is axially arranged between the second gear ratio and the other one of the fourth and the sixth gear ratio.

Independently, the gear 11 is axially arranged between the gears 10, 12 (according to the axis B or D).

Independently, the gear 9 is axially arranged between the gear 10 (namely, one of the other gears) and the engagement device 17 (according to the axis B or D).

The gear 12 preferably defines the seventh gear ratio. In other words, the gearwheel 12" has the smallest diameter with respect to the other gearwheels 9", 10", 11", 13", 14", 15".

Furthermore, the gear 13 preferably defines the fifth gear ratio. In other words, the gearwheel 13" has a diameter that is larger than that of two other of the wheels 9", 10", 11", 12", 14", 15" and smaller than that of four other of the wheels 9", 10", 11", 12", 14", 15".

Furthermore, the gear 14 preferably defines the third gear ratio. In other words, the gearwheel 14" has a diameter that is smaller than that of two other of the wheels 9", 10", 11", 12", 13", 15" and larger than that of four other of the wheels 9", 10", 11", 12", 13", 15".

Furthermore, the gear 15 preferably defines the first gear ratio. In other words, the gearwheel 15" has the largest diameter with respect to that of the gearwheels 9", 10", 11", 12", 13", 14".

In particular, the gear 12 is axially arranged between the gears 11, 13 (according to the axis C or the axis D).

Independently, in particular, the gear 13 is axially arranged between the gears 12, 14 (according to the axis B or D).

Independently, in particular, the gear 14 is axially arranged between the gears 13, 15 (according to the axis B or D).

Therefore, according to the embodiment shown herein, the diameter of the gearwheel 9" is between that of the gearwheel 13" and that of the gearwheel 14".

The diameter of the gearwheel 10" is between that of the gearwheel 12" and that of the gearwheel 13".

The diameter of the gearwheel 11" is between that of the gearwheel 14" and that of the gearwheel 15".

The diameter of the gearwheel 13" is between that of the gearwheel 9" and that of the gearwheel 10".

The diameter of the gearwheel 14" is between that of the gearwheel 11" and that of the gearwheel 9".

Furthermore, more generally, two axially adjacent gears of the gears 9, 10, 11, 12, 13, 14, 15 define respective gear ratios astride (according to their numerical order) the one defined by another non-adjacent gear of the gears 9, 10, 11, 12, 13, 14, 15. More in detail, if the two axially adjacent gears are even, the other non-adjacent gear is odd and vice versa (if the two adjacent gears are odd, the other is even).

Optionally, the gearbox 5 further comprises a reverse gear 24 comprising at least two gearwheels 24', 24" respectively carried by one of the shafts 7, 8 and the shaft 16.

Specifically, the gearwheel 24" is carried by the shaft 16 in a rotatable manner with respect to it around the axis D, while the gearwheel 24' is carried by one of the shafts 7, 8, in a fixed manner with respect to it, namely it is attached to it. Alternatively, according to a variant which is not shown herein, the gearwheel 24' could have been carried by one of the shafts 7, 8 in a rotatable manner with respect to it around the axis B or C, while the gearwheel 24" could have been carried by the shaft 16 in a fixed manner with respect to it.

Specifically, moreover, the gearwheel 24" is selectively rotatably fixable to the shaft 16 by means of an engagement device, in particular by means of the engagement device 21. Herein, the engagement device 21 is axially arranged (according to the axis D or B) between the reverse gear 24 and the gear 11, more in particular between the gearwheels 24", 11". According to the variant that is not shown herein, the gearwheel 24' could have been selectively rotatably fixable to one of the shafts 7, 8 by means of an engagement device.

Therefore, the gearwheel 24' could define an element of the set of first engageable gearwheels or of the second engageable gearwheels depending on whether it is carried by the shaft 7 or by the shaft 8, respectively. Alternatively, the gearwheel 24" could define an element of the set of third engageable gearwheels.

In the embodiment shown herein, the gearwheel 24' is carried by the shaft 7 and, more in particular, is fixedly carried by the shaft 7, whereby the gearwheel 24" is rotatably carried with respect to the shaft 16, namely it defines an element of the set of third engageable gearwheels.

The gear 11 forms, with the reverse gear 24, a gear group that is distinct from the gear group formed by the gear 10 and possibly by the gear 9.

The gear group 11, 24 is axially arranged between the gear group 9, 10 and the gears 12, 13, 14, 15, according to the axis B or C.

Therefore, according to a variant that is not shown herein, the gears 11, 24 could be switched in position with the engagement device 21 axially between them.

In the embodiment shown herein, the gears 10, 11 are axially arranged (according to the axis B or D) between the gear 9 and the reverse gear 24, although the reverse gear 24 could be axially arranged between the gears 9, 10 and the gear 11, according to the variant that is not shown herein.

Furthermore, independently, in the embodiment shown herein, the reverse gear 24 is axially arranged (according to the axis B or D) between the gears 10, 11 (possibly also including the gear 9) and the gears 12, 13, 14, 15.

The gear 11 is axially arranged (according to the axis B or D) between the gear 10 and the reverse gear 24.

The gear 12 is axially arranged (according to the axis B or D) between the gear 13 and the reverse gear 24.

More in general, the gears 12, 13 and the gears 14, 15 form respective gear groups, one of which can be arranged between the other and the gear group 11, 24. Herein, the gear group 12, 13 is arranged between the gear group 11, 24 and the gear group 14, 15, although the latter could have been arranged between the gear group 12, 13 and the gear group 11, 24, according to a variant. Furthermore, the gears 12, 13 as well as, independently, the gears 14, 15 could be axially switched in position, according to variants that are not shown herein.

Furthermore, the gear 10 or its gear group is preferably arranged between the gear 9 and the gear group 11, 24.

Being optional, the reverse gear 24 could be absent.

The engagement devices 17, 18, 19, 20, 21, 22 described above can be operated by respective actuators (not shown), which are controlled by the control unit ECU. The control unit ECU controls the engagement devices 17, 18, 19, 20, 21, 22 by sending electrical control signals addressed to them.

The control unit ECU is configured to control the engagement devices 17, 18, 19, 20, 21, 22 through direct input command of the driver of the motor vehicle 1 or in an automatic manner following a gear shift control logic deployed in a specific software code, which can be stored in the control unit ECU.

The apparatus of the motor vehicle 1 can be provided with a dedicated control software code in the ECU of the transmission configured to recognize signals from the sensors installed in the motor vehicle 1, for example the torque request at the output shaft 16 and the angular speed of the input shaft 6, and to automatically define the gear shift without any intervention by the driver.

Hereinafter, some operating modes of the apparatus of the motor vehicle 1 will be described by way of example.

A first operating mode involves the motor vehicle 1 being parked, namely with the wheels 2 immobile or not rotating.

In this operating mode, the control unit ECU can control the engagement device 18 to rotationally fix the gearwheel 9' to the shaft 7, which, in turn, is connected to the shaft 6 through the engagement device 17. Furthermore, the control unit ECU controls the engagement device 20 so that the gearwheel 9" remains free to rotate with respect to the shaft 16 around the axis D. In this way, the motor-generator 4 and the source 3 are connected to each other, while neither of them is connected to the axle or to the wheels 2. By so doing, the motor-generator 4 can generate electrical energy by means of the power supplied by the source 3 or start the source 3.

A second operating mode involves the movement of the motor vehicle I using the propulsion of the motor-generator 4 or, more in general, the connection between the wheels 2 or the axle and the motor-generator 4.

In this operating mode, the control unit ECU can control the engagement device 18 to rotationally fix the gearwheel 9' to the shaft 7, which, though, remains disconnected from the shaft 6 through a control of the engagement device 17 by means of the control unit ECU. By so doing, the motor-generator 4 can transmit power to the shaft 7.

The control unit ECU can thus control one of the engagement devices 20, 21 to rotatably fix one of the gearwheels 9", 11", 24" to the shaft 16, thus respectively engaging one of the fourth gear ratio, the second gear ratio, or a reverse gear.

In this way, the electric motor-generator 4 at least contributes to the propulsion of the motor vehicle 1.

Indeed, in addition, the control unit ECU can control the engagement device 17 to connect the shaft 6 to the shaft 8, as well as one of the engagement devices 19, 22 to engage one of the odd ratios, so that both the source 3 and the motor-generator 4 contribute in parallel to the propulsion of the motor vehicle 1.

Owing to the above, the advantages of the apparatus according to the invention are evident.

The source 3 and the motor-generator 4 can be connected to the parked motor vehicle 1.

In addition, since the motor-generator 4 controls the rotation of the entire gear 9, the engagement device 20 can also be a simple dog-clutch, instead of a synchronizer. This leads to a significant reduction in the radial dimension of the engagement device 20, which can thus be placed in the same axial position along the axes B, D as the engagement device 18.

Furthermore, the motor-generator 4 can be used for the propulsion of the motor vehicle 1 with the most appropriate gear ratios, i.e. with the second gear ratio and the reverse gear (namely, when there is a greater torque request for the wheels 2), as well as with the fourth gear ratio for suburban roads.

In addition, the arrangement of the reverse gear 24 halfway between the gears 9, 10, 11 and the gears 12, 13, 14, 15 is ideal for a reduction in the overall dimensions of the gearbox 5, without an excessive increase in the complexity of the gearbox 5 itself.

Finally, the apparatus according to the invention can be subject to changes and variants, which, though, do not go beyond the scope of protection set forth in the appended claims.

In particular, the number, the shape and the arrangement of the components described and shown herein could be different.

Furthermore, each detail depicted in the drawings regarding the arrangement and size of the gears 9, 10, 11, 12, 13, 14, 15, 24 and of the engagement devices 17, 18, 19, 20, 21, 22, 23 must be considered as independent of the other details.

Similarly, the graphic representation of support elements such as for example the bearings for the shafts 7, 8, 16 or the other schematically shown bearings is to be considered merely explanatory and susceptible to variations.

Finally, the representation of FIG. 2 is merely schematic for a better understanding of the key aspects of the description, so it is not to be understood as perfectly realistic.

The invention claimed is:

1. An apparatus with a dual-clutch gearbox for a motor vehicle, the dual-clutch gearbox comprising:

an input shaft to be connected to a power source of the motor vehicle;

a first shaft extending along a straight axis and carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels;

a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels;

an output shaft to be connected to an axle of the motor vehicle, the output shaft carrying a plurality of third gearwheels meshing with the first gearwheels to form first gears and a plurality of fourth gearwheels meshing with the second gearwheels to form second gears, wherein the third and fourth gearwheels meshing with the first and second engageable gearwheels, respectively, are carried in a fixed manner by the output shaft, thus defining respective elements of a set of rotationally fixed third gearwheels, and wherein the third and fourth gearwheels meshing respectively with the first and second rotationally fixed gearwheels are rotatably carried with respect to the output shaft, thus defining respective elements of a set of third engageable gearwheels;

a double clutch selectively controllable to connect one between the first and second shafts with the input shaft;

a first engagement means for each of the first engageable gearwheels, the first engagement means being controllable for rotationally fixing the relative of the first engageable gearwheels to the first shaft selectively;

a second engagement means for each of the second engageable gearwheels, the second engagement means being controllable for rotationally fixing the relative of the second engageable gearwheels to the second shaft selectively;

a third engagement means for each of the third engageable gearwheels, the third engagement means being controllable to rotationally fix the relative of the third engageable gearwheels to the output shaft selectively;

a reverse gear comprising at least a seventh and an eighth gearwheel respectively carried in a fixed manner by a third shaft, defined by one between the first and second shafts, and by the output shaft in a rotatable manner with respect to the output shaft, or respectively carried by the third shaft in a rotatable manner with respect to the third shaft and in a fixed manner by the output shaft, respectively; and a fourth engagement means controllable for rotatably fixing the gearwheel carried in a rotatable manner among the seventh and eighth gearwheels to the relevant bearing shaft among the third shaft and the output shaft;

wherein a gear of the first gears and the other gears of the first gears form a first gear group with the reverse gear and a second gear group, respectively, wherein the first gear group is arranged between the second gear group and the second gears according to the said straight axis, wherein the first shaft and the output shaft also carry, respectively, a fifth gearwheel and a sixth gearwheel meshing with the fifth gearwheel to form a third gear, wherein the third gear, the first gears, and the second gears respectively comprise one gear, two gears, and four gears defining respective seven gear ratios numerically reorderable in an ascending order from a first gear ratio up to a seventh gear ratio so as to correspond to seven respective degrees of reduction in angular input speed gradually decreasing from the first to the seventh gear ratio, the gear ratios being thus divisible into even and odd ratios according to their numerical order, wherein the second gears comprise a sixth, a seventh, an eighth, and a ninth gear, wherein:

the sixth and seventh gears form a third gear group and define the seventh gear ratio and the fifth gear ratio, respectively;

the eighth and ninth gears form a fourth gear group and define the third and first gear ratio, respectively;

the third gear group being arranged between the first gear group and the fourth gear group, wherein the fifth gearwheel is carried by the first shaft in a rotatable manner about the first shaft, thus making part of the set of the first engageable gearwheels, wherein the sixth gearwheel is carried by the output shaft in a fixed manner with respect to the output shaft, thus making part of the set of the third rotationally fixed gearwheels, or in a rotatable manner with respect to the output shaft, thus making part of the set of the third engageable gearwheels, the apparatus further comprising an electric motor-generator having a rotor coupled to the fifth gearwheel via a transmission, such that a rotation of the rotor can be transmitted to the fifth gearwheel and vice versa.

2. The apparatus according to claim 1, wherein the sixth gearwheel is rotatably carried by the output shaft with respect to the output shaft, thus being part of the set of third engageable gearwheels.

3. The apparatus according to claim 2, wherein the third engagement means for the sixth gearwheel comprises a dog-clutch configured to engage the sixth gearwheel on the output shaft.

4. The apparatus according to claim 1, wherein the second gear group is arranged between the third gear and the first gear group according to said straight axis.

5. The apparatus according to claim 1, wherein the third gear and the first gears define the even ratios, the second gears defining the odd ratios.

6. The apparatus according to claim 1, in which the third gear defines the fourth gear ratio.

7. The apparatus according to claim 1, wherein the first gears comprise a fourth and a fifth gear, wherein:

the fourth gear defines one of the fourth and sixth gear ratios and is arranged between the third gear and the fifth gear according to said straight axis, and the fifth gear defines the second gear ratio, and is part of the first gear group.

8. The apparatus according to claim 7, wherein:

the first gearwheel of the fourth gear is carried in a rotatable manner about the first shaft, the third gearwheel of the fifth gear is carried in a rotatable manner about the output shaft, and the eighth gearwheel of the reverse gear is carried in a rotatable manner about the output shaft.

9. The apparatus according to claim 7, wherein the fifth gear is arranged between the reverse gear and the fourth gear according to said straight axis.

10. The apparatus according to claim 1, wherein:

the second gearwheels of the sixth and seventh gears are carried in a rotatable manner about the second shaft, and the fourth gearwheels of the eighth and ninth gears are carried in a rotatable manner about the output shaft.

11. The apparatus according to claim 1, wherein the third shaft is defined by the first shaft.

12. The apparatus according to claim 1, wherein the first and second shafts are coaxial with each other.

* * * * *